US012811086B2

(12) United States Patent
Kuffel et al.

(10) Patent No.: US 12,811,086 B2
(45) Date of Patent: Nov. 24, 2026

(54) GEOMETRIC FEATURES FOR LAYER AND FEATURE ALIGNMENT AND INSPECTION FOR USE IN LAYERED ADDITIVE MANUFACTURING OF PASSIVE AND ACTIVE RADIO FREQUENCY (RF) ELECTRONICS

(71) Applicant: Elve Inc., Davis, CA (US)

(72) Inventors: Mikhail Kuffel, Sacramento, CA (US); Blake Griffin, Seattle, WA (US); Danny Chan, San Mateo, CA (US); Michelle Gonzalez, Woodland, CA (US); Diana Gamzina Daugherty, Davis, CA (US); Richard Kowalczyk, Redwood City, CA (US)

(73) Assignee: Elve Inc., Davis, CA (US)

( * ) Notice: Subject to any disclaimer, the term of this patent is extended or adjusted under 35 U.S.C. 154(b) by 0 days.

(21) Appl. No.: 18/634,127

(22) Filed: Apr. 12, 2024

(65) Prior Publication Data

US 2024/0371593 A1 Nov. 7, 2024

Related U.S. Application Data

(60) Provisional application No. 63/464,595, filed on May 7, 2023.

(51) Int. Cl.
*H01J 9/00* (2006.01)
*B32B 3/26* (2006.01)
(Continued)

(52) U.S. Cl.
CPC ................ *H01J 9/00* (2013.01); *B33Y 80/00* (2014.12); *H01J 25/34* (2013.01)

(58) Field of Classification Search
CPC ...... H01J 9/02; H01J 9/00; H01J 25/34; H01J 9/18; H01J 23/06; B32B 3/266
See application file for complete search history.

(56) References Cited

U.S. PATENT DOCUMENTS 3,999,263 A * 12/1976 Marshall .................. H01J 9/02 445/36
4,695,766 A * 9/1987 Waterman .............. H01J 25/38 331/157

(Continued)

OTHER PUBLICATIONS

PCT International Search Report and the Written Opinion mailed Aug. 5, 2024, issued in related International Application No. PCT/US2024/024507 (12 pages).

*Primary Examiner* — Joanna Pleszczynska
(74) *Attorney, Agent, or Firm* — Sheppard Mullin Richter & Hampton LLP

(57) ABSTRACT

A method of manufacturing a radio frequency (RF) or electron beam structure, comprises forming each layer of multiple layers to be assembled and bonded together with positional alignment, the forming each layer including forming a first via segment of a first particular shape and dimension in the layer at a first location in the layer, such that when the first via segments of the multiple layers are assembled with positional alignment the multiple first via segments align to form a first via; and inserting a first analogous pin into the first via, the first analogous pin being formed based on the first particular shape and dimension of each of the first via segments, such that inserting the first analogous pin into the first via assists in causing the multiple layers to be assembled with positional alignment.

12 Claims, 8 Drawing Sheets

(51) Int. Cl.

| | |
|---|---|
| ***B33Y 80/00*** | (2015.01) |
| ***H01J 9/02*** | (2006.01) |
| ***H01J 9/18*** | (2006.01) |
| ***H01J 23/06*** | (2006.01) |
| ***H01J 25/34*** | (2006.01) |

(56) References Cited

U.S. PATENT DOCUMENTS

| | | | | |
|---|---|---|---|---|
| 5,148,135 | A * | 9/1992 | Stein ........................ | H01P 1/047 333/260 |
| 11,640,893 | B1 * | 5/2023 | Borchard ................ | H01J 29/54 378/138 |
| 11,894,208 | B2 | 2/2024 | Daugherty | |
| 2002/0017855 | A1 | 2/2002 | Cooper et al. | |
| 2006/0087218 | A1 | 4/2006 | Mikami et al. | |
| 2013/0063048 | A1 | 3/2013 | Matthies | |
| 2020/0313304 | A1 * | 10/2020 | Glogowski ........ | H01Q 21/0037 |

* cited by examiner

GEOMETRIC FEATURES FOR LAYER AND FEATURE ALIGNMENT AND INSPECTION FOR USE IN LAYERED ADDITIVE MANUFACTURING OF PASSIVE AND ACTIVE RADIO FREQUENCY (RF) ELECTRONICS

PRIORITY CLAIM

This application is a nonprovisional application which claims the benefit of and hereby incorporates by reference U.S. provisional application No. 63/464,595, entitled “Inspection and Alignment for Layered Additive Manufacturing of Passive and Active RF Electronics,” filed on May 7, 2023, by inventors Mikhail Kuffel, Blake Griffin, Danny Chan, Michelle Gonzalez, Diana Gamzina Daugherty and Richard Kowalczyk.

TECHNICAL FIELD

This invention relates generally to radio-frequency (RF) electronics, and more particularly provides geometric features for alignment and inspection for use in layered additive manufacturing of passive and active RF electronics.

BACKGROUND

Layered additive multi-material-manufacturing (LAM3) processes have been developed to produce millimeter wave structures with high-quality radio-frequency (RF) performance that are also suitable for ultra-high vacuum operation of vacuum electronics. LAM3 processes provide improvements in manufacturing processes for RF electronic devices having multi-material layers bonded together to form one or more RF electronic devices simultaneously. LAM3 processes have been demonstrated in manufacturing of vacuum electronic devices, and apply to microwave frequencies, millimeter wave frequencies, as well as sub-terahertz and terahertz frequencies, active and passive devices, devices operating in vacuum or other atmospheric conditions, and devices manufactured with metallic or other multi-materials. See U.S. Pat. No. 11,894,208, which is hereby incorporated by reference.

SUMMARY

Embodiments of the invention include the addition of geometric features for use in layered additive manufacturing of passive and active radio frequency (RF) electronics (1) for alignment purposes, e.g., to align assembled RF structures to external components, to align features to external components, and/or to align individual layers to each other pre-bonding or during bonding, and/or (2) for post-bonding quality inspection, e.g., to inspect positional (e.g., x, y and/or z directions) and/or rotational accuracy of the layers assembled and bonded together, to inspect positional and/or rotational accuracy of feature manufacturing, and/or to inspect positional and/or rotational accuracy of feature alignment. Examples of RF structures include waveguides and RF interaction structures such as Traveling Wave Tubes (TWTs).

For layer alignment, embodiments of the solution may use geometric features manufactured from feature materials properly matched to ensure matching, looseness, or interference at bonding conditions. For example, embodiments of the solution may include pockets or bosses formed using the layers that are assembled and bonded to form the RF or beam interaction structure. The pockets and bosses may be used to align the structure and/or features of the structure to external components. Embodiments of the solution may include a pin pocket in a structure and an external component, such that a pin can be inserted into the two pin pockets to align the structure to the external component. Embodiments of the solution may include a via formed across adjacent layers, such that a pin can be inserted therein to align the adjacent layers before and/or while the adjacent layers are bonded.

For alignment inspection, embodiments of the solution may include geometric features formed through multiple layers either within a face of the RF or electron beam structure or at the edge of the structure. The geometric features can be examined post ponding to confirm positional and/or rotational accuracy of the layers. Examples of the geometric inspection features can include a concentric-circular alignment inspection feature, a stair-step alignment inspection feature, and a stair-pattern alignment inspection feature. By examining these inspection features, positional and/or rotational deviations across layers can be evaluated and detected.

Some geometric features can support alignment pre-bonding and/or during bonding as well as inspection post-bonding.

In some embodiments, the present invention provides a method of manufacturing a radio frequency (RF) or electron beam structure, comprising forming each layer of multiple layers to be assembled and bonded together with positional alignment, the forming each layer including forming a first via segment of a first particular shape and dimension in the layer at a first location in the layer, such that when the first via segments of the multiple layers are assembled with positional alignment the multiple first via segments align to form a first via; and inserting a first analogous pin into the first via, the first analogous pin being formed based on the first particular shape and dimension of each of the first via segments, such that inserting the first analogous pin into the first via assists in causing the multiple layers to be assembled with positional alignment.

The structure may include a waveguide, beam transport opening, electron beam transport structure, or an RF interaction structure. The first particular shape may include a circular cross-section. The first particular shape may include a polygonal cross-section, such that inserting the first analogous pin into the first via further assists in causing the multiple layers to be assembled with rotational alignment. Each of the via segments may include an identical shape and dimension, and the via may include a consistent cross-section across its length. The first analogous pin may include a top surface, a bottom surface and a length, and the length of the first analogous pin may be identical to a length of the first via, such that when the first analogous pin is inserted into the first via each of the top surface and bottom surface is flush with a surface of a layer of the multiple layers. The first analogous pin may include a top surface, a bottom surface and a length, and the length of the first analogous pin may be shorter than a length of the first via, such that when the first analogous pin is inserted into the first via each of the top surface and bottom surface is recessed from a surface of a layer of the multiple layers. The first analogous pin may include a top surface, a bottom surface and a length, and the length of the first analogous pin may be longer than a length of the first via, such that when the first analogous pin is inserted into the first via at least one of the top surface or bottom surface extends beyond a surface of a layer of the multiple layers. The method may further comprise bonding the multiple layers together and removing the first analogous pin after the bonding of the multiple layers. The method may further comprise, after removing the first analogous pin, evaluating one or more walls of the first via to inspect positional alignment. The forming each layer of multiple layers to be assembled and bonded together with positional alignment may include forming a second via segment of a second particular shape and dimension in the layer at a second location in the layer, such that when the second via segments of the multiple layers are assembled with positional alignment the multiple layers align to form a second via; and the method may further comprise inserting a second analogous pin into the second via, the second analogous pin being formed based on the second particular shape and dimension of each of the second via segments, such that inserting the first analogous pin into the first via and inserting the second analogous pin into the second via assist in causing the multiple layers to be assembled with positional and rotational alignment.

In some embodiments, the present invention may provide an RF or electron beam structure, comprising multiple layers to be assembled and bonded together with positional alignment, each layer including a first via segment of a first particular shape and dimension in the layer at a first location in the layer, such that when the first via segments of the multiple layers are assembled with positional alignment the multiple first via segments align to form a first via; and a first analogous pin configured to be inserted into the first via, the first analogous pin configured to have the first particular shape and dimension based on each of the first via segments, such that when the first analogous pin is inserted into the first via the first analogous pin assists in causing the multiple layers to be assembled with positional alignment.

The structure may include a waveguide, beam transport opening, an electron beam transport structure, or an RF interaction structure. The first particular shape may include a circular cross-section. The first particular shape may include a polygonal cross-section, and wherein the first analogous pin when inserted into the first via is configured to further assist in causing the multiple layers to be assembled with rotational alignment. Each of the via segments may include an identical shape and dimension, and the via may include a consistent cross-section across its length. The first analogous pin may include a top surface, a bottom surface and a length, the length of the first analogous pin may be identical to a length of the first via, and the first analogous pin may be configured such that when inserted into the first via each of the top surface and bottom surface is flush with a surface of a layer of the multiple layers. The first analogous pin may include a top surface, a bottom surface and a length, the length of the first analogous pin may be shorter than a length of the first via, and the first analogous pin may be configured such that when inserted into the first via each of the top surface and bottom surface is recessed from a surface of a layer of the multiple layers. The first analogous pin may include a top surface, a bottom surface and a length, and the length of the first analogous pin may be longer than a length of the first via, such that when the first analogous pin is inserted into the first via at least one of the top surface or bottom surface extends beyond a surface of a layer of the multiple layers. The first analogous pin may be configured for removal after the bonding of the multiple layers. One or more walls of the first via may be configured to assist in establishing positional alignment upon inspection. Each layer of multiple layers to be assembled and bonded together with positional alignment may include a second via segment of a second particular shape and dimension in the layer at a second location in the layer, such that when the second via segments of the multiple layers are assembled with positional alignment the multiple layers align to form a second via; and a second analogous pin may be configured to be inserted into the second via, the second analogous pin being formed based on the second particular shape and dimension of each of the second via segments, such that the first analogous pin when inserted into the first via and the second analogous pin when inserted into the second via assist in causing the multiple layers to be assembled with positional and rotational alignment.

In some embodiments, the present invention may provide rectangular (including square) alignment cutouts integrated into individual layers for accepting rectangular alignment pins. In some embodiments, the present invention may provide rotated rectangular (including square) alignment cutouts integrated into individual layers. In some embodiments, the present invention may provide rectangular features (including square) with recesses integrated into individual layers. In some embodiments, the present invention may provide a combination of alignment features for multilayer assembly. In some embodiments, the present invention may provide concentric circular features of different sizes cut into different layers. In some embodiments, the present invention may provide beams cut into different layers at different positions.

DETAILED DESCRIPTION

Figure 1A:
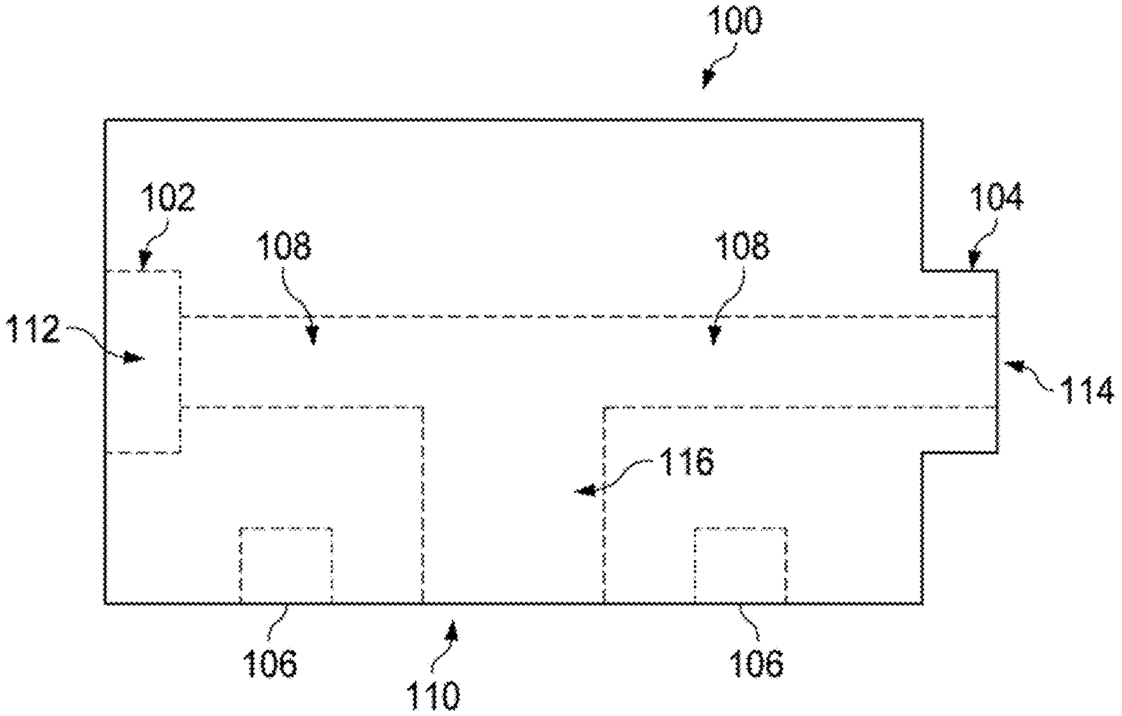
FIG. 1A is a cross-sectional view of an example radio frequency (RF) or electron beam structure, in accordance with some embodiments of the present invention.

The following description is provided to enable a person skilled in the art to make and use various embodiments of the invention. Modifications are possible. The generic principles defined herein may be applied to the disclosed and other embodiments without departing from the spirit and scope of the invention. Thus, the claims are not intended to be limited to the embodiments disclosed, but are to be accorded the widest scope consistent with the principles, features and teachings herein.

Embodiments of the invention include the addition of geometric features for use in layered additive manufacturing of passive and active radio frequency (RF) electronics (1) for alignment purposes, e.g., to align assembled RF or electron beam structures to external components, to align features to external components, and/or to align individual layers to each other pre-bonding or during bonding, and/or (2) for post-bonding quality inspection, e.g., to inspect positional (e.g., x, y and/or z directions) and/or rotational accuracy of the layers assembled and bonded together, to inspect positional and/or rotational accuracy of feature manufacturing, and/or to inspect positional and/or rotational accuracy of feature alignment. Precision (measurability) of feature design and feature location assists to enable alignment before and/or during bonding and enables inspection (e.g., validation) of alignment post ponding. Examples of RF or electron beam structures include waveguides such as couplers, splitters, and filters and RF interaction structures such as circuits for Traveling Wave Tubes (TWTs) and klystrons.

For layer alignment, embodiments of the solution may use geometric features manufactured from feature materials properly matched to ensure matching, looseness, or interference at bonding conditions. For example, embodiments of the solution may include pockets or bosses formed using the layers that are assembled and bonded to form the RF or electron beam structure. The pockets and bosses may be used to align the RF structure and/or features of the RF or electron beam structure to external components. Embodiments of the solution may include a pin pocket in each of an RF or electron beam structure and an external component, such that an alignment pin can be inserted into the two pin pockets to align the RF or electron beam structure to the external component. Embodiments of the solution may include an alignment via formed across adjacent layers, such that an alignment pin can be inserted therein to align the adjacent layers before and/or while the adjacent layers are bonded.

For alignment inspection, embodiments of the solution may include geometric features formed through multiple layers either within a face of the RF or electron beam structure or at the edge of the RF or electron beam structure. The geometric features can be examined post bonding to confirm positional and/or rotational accuracy of the layers. Examples of the geometric inspection features can include a concentric-circular inspection feature, a stair-step inspection feature, and a stair-pattern inspection feature. By examining these inspection features, positional and/or rotational deviations across layers can be evaluated and detected.

Some geometric features can support alignment prebonding and/or during bonding and inspection post-bonding.

FIG. 1A is a cross-sectional side view of an example RF or electron beam structure 100, e.g., a waveguide, in accordance with some embodiments of the present invention. The RF or electron beam structure 100 includes a first path 108 extending across a length of the RF or electron beam structure 100 from a left opening 112 on the left side to a right opening 114 on the right side and a second path 116 extending from the first path 108 down to a bottom opening 110 on the bottom. The left side opening 112 may be positioned in a pocket 102 formed on the left side of the RF or electron beam structure 100. The right side opening 114 may be positioned in a boss 104 extending outwardly on the right side of the RF or electron beam structure 100. Alignment features (pockets, bosses) can also be used for alignment of other components to the structure that are not for RF. For example, the electron gun and the collector can be aligned to the beam tunnel on a TWT circuit.

Each of the pocket 102 and the boss 104 may act as alignment features for external components, such as additional RF or electron beam structures, an electron gun, a collector, etc. In some embodiments, the pocket 102 may be formed to receive a boss of a different external component, such as an RF circuit, electron gun or another waveguide. Similarly, in some embodiments, the boss 104 may be formed to be inserted into a pocket of a different external component, such as an RF circuit, electron collector or another waveguide. In some embodiments, the shape of each of the pocket 102 and the boss 104 may be cuboid (including cubical). Other shapes are also possible.

The RF or electron beam structure 100 may include one or more pin pockets 106, e.g., on the bottom side, configured to receive alignment pins for aligning external components to the RF or electron beam structure, e.g., to one or more features of the RF or electron beam structure 100. For example, the one or more pin pockets 106 may be configured to cooperate with pin pockets on an external component in order to align the bottom opening 110 to a feature (e.g., opening, magnet, collector, etc.) of the external component. In some embodiment, each pin pocket 106 may be formed to receive an alignment pin of a particular shape and size, e.g., a cylindrical alignment pin, an alignment pin having a rectangular (including square) cross-section, etc. In some embodiments, the alignment pin may be designed to be equal to, shorter than or longer than the combined depths of the pin pockets of the components into which the pin is being inserted. In some embodiments, the alignment pins may be permanent or removable from the pin pockets 106. The cross-sectional shape of the alignment pin can be analogous to the cross-sectional shape of the pin pocket 106, although it need not be. An alignment pin with a circular cross-section will fit into a pin pocket 106 with a square cross-section. So will other shapes fit. The cross-sectional shape of the alignment pin and/or the pin pocket 106 may be circular, oval, polygonal, cross-shaped, rotated polygonal, etc. Further, the pin pockets across two components can have different shapes and/or sizes. Accordingly, different segments of an alignment pin can have different shapes and/or sizes based on the shape and/or size of the pin pockets into which the alignment pin will be inserted.

Figure 1B:
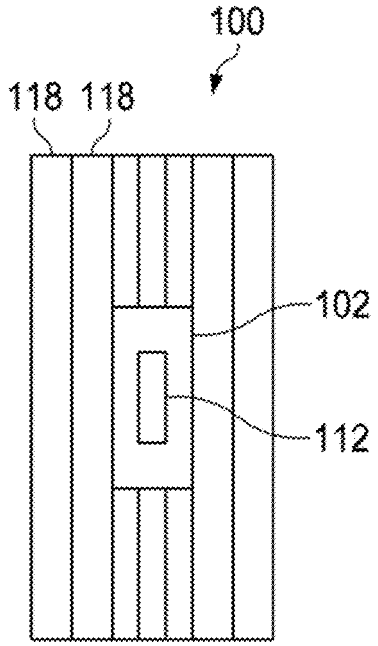
FIG. 1B is a left side view of the example RF or electron beam structure of FIG. 1A, in accordance with some embodiments of the present invention.

FIG. 1B is a left side view of the example RF or electron beam structure 100, in accordance with some embodiments of the present invention. As shown, the pocket 102 is formed into the layers 118 that form the RF or electron beam structure 100. Accordingly, in some embodiments, the pocket 102 may have dimensions that align with one or more surfaces of one or more layers 118. As shown, the pocket 102 aligns with the left surface of the third layer 118 and the right surface of the fifth layer 118. Further, the left opening 112 may have dimensions that align with one or more surfaces of one or more layers 118. As shown, the left opening 112 aligns with the left and right surfaces of the fourth layer 118. The thickness of the layers 118 may be identical or one, some or all may be different.

Figure 1C:
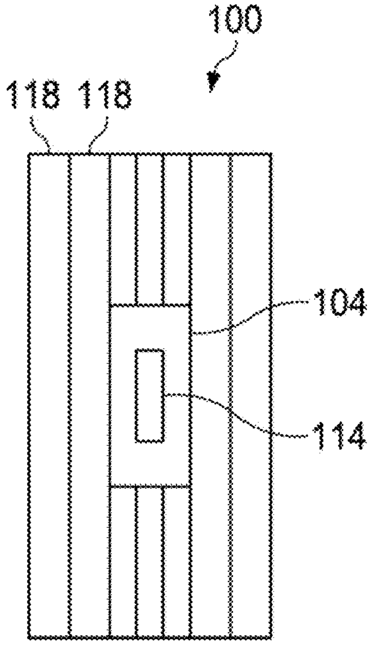
FIG. 1C is a right side view of the example RF or electron beam structure of FIG. 1A, in accordance with some embodiments of the present invention.

FIG. 1C is a right side view of the example RF or electron beam structure 100, in accordance with some embodiments of the present invention. As shown, the boss 104 is formed into the layers 118 that form the RF or electron beam structure 100. Accordingly, in some embodiments, the boss 104 may have dimensions that align with one or more surfaces of one or more layers 118. As shown, the boss 104, like the pocket 102, aligns with the left surface of the third layer 118 and the right surface of the fifth layer 118. Further, the right opening 114 may have dimensions that align with one or more surfaces of one or more layers 118. As shown, the right opening 114, like the left opening 112, aligns with the left and right surfaces of the fourth layer 118. Although the pocket 102 and boss 104 align with the surfaces of the same layers 118, the pocket 102 and boss 104 may align with different layers 118. Similarly, although the left opening 112 and right opening 114 align with the surfaces of the same layers 118, the left opening 112 and right opening 114 may align with different layers 118.

Figure 1D:
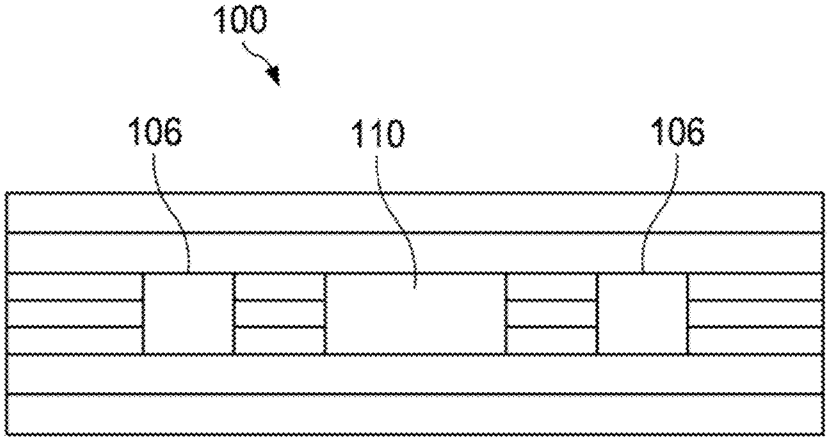
FIG. 1D is a bottom side view of the example RF or electron beam structure of FIG. 1A, in accordance with some embodiments of the present invention.

FIG. 1D is a bottom view of the example RF or electron beam structure 100, in accordance with some embodiments of the present invention. As shown, the bottom opening 110 and pin pockets 106 are formed into the layers 118 that form the RF or electron beam structure 100. Accordingly, in some embodiments, the bottom opening 110 may have dimensions that align with one or more surfaces of one or more layers 118. As shown, the bottom opening 110 aligns with a surface of the third layer 118 and a surface of the fifth layer 118. Further, the pin pockets 106 may have dimensions that align with one or more surfaces of one or more layers 118. As shown, the pin pockets 106, like the bottom opening 110, align with the a surface of the third layer 118 and a surface of the fifth layer 118. Although the bottom opening 110 and pin pockets 106 align with the surfaces of the same layers 118, the bottom opening 110 and pin pockets 106 may align with different layers 118. Similarly, although each of the pin pockets 106 aligns with the surfaces of the same layers 118, the pin pockets 106 may align with different layers 118. In some embodiments, a pin pocket 106 may formed into a single layer.

Figure 2A:
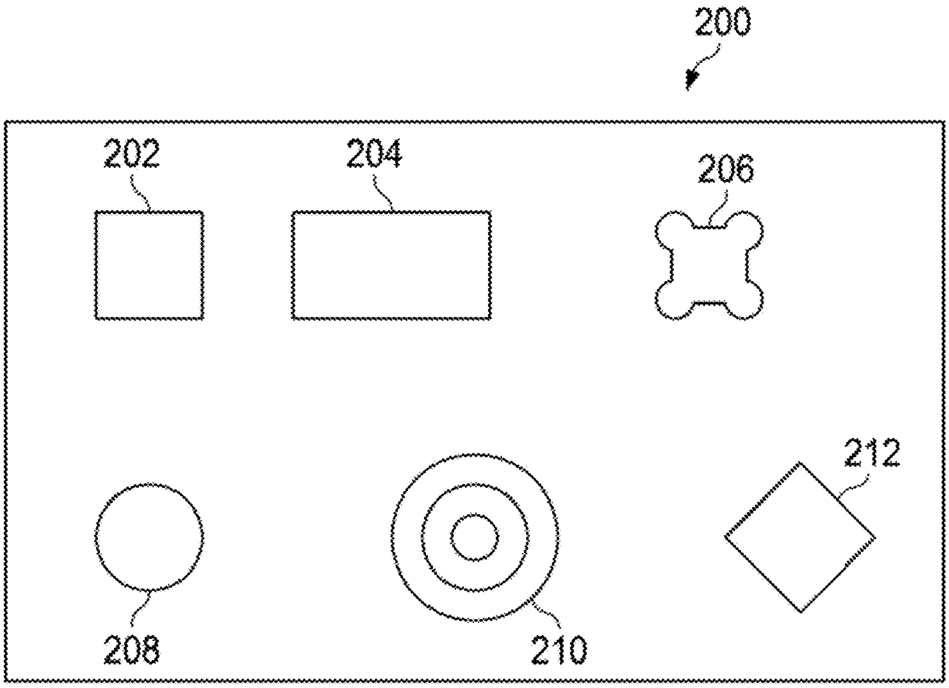
FIG. 2A is a front view of the example RF or electron beam structure of FIG. 1A, in accordance with some embodiments of the present invention.

FIG. 2A is a front view of the example RF or electron beam structure 100, in accordance with some embodiments of the present invention. The RF or electron beam structure 100 illustrates example alignment features, including a square alignment feature 202, a rectangular alignment feature 204, a rotated rectangular (including square) alignment feature 212, a modified rectangular alignment feature having reliefs 206, and a circular feature 208.

Each of the alignment features 202, 204, 206, 208 and 212 may define a pin pocket, such as the pin pocket 106, that assists in aligning external features using an alignment pin or male feature; or may define a multi-layer alignment via that extends through two or more layers for layer alignment before bonding. The circular alignment feature 208 may support positional alignment but not rotational alignment. The square alignment feature 202, rectangular alignment feature 204, modified rectangular alignment feature having reliefs 206, and rotated rectangular alignment feature 212 may support positional and rotational alignment. Two alignment features (whether circular or polygonal) may support rotational alignment even better than rectangular alignment features. The modified rectangular alignment feature having reliefs 206 may improve insertion of an alignment pin with sharp corners, especially when the alignment pin is ground with high precision to the same dimensions as the pin pocket 106. The rotated rectangular alignment feature 212 with respect to other alignment features provide limits on skew deviation between the layers 118.

Figure 2B:
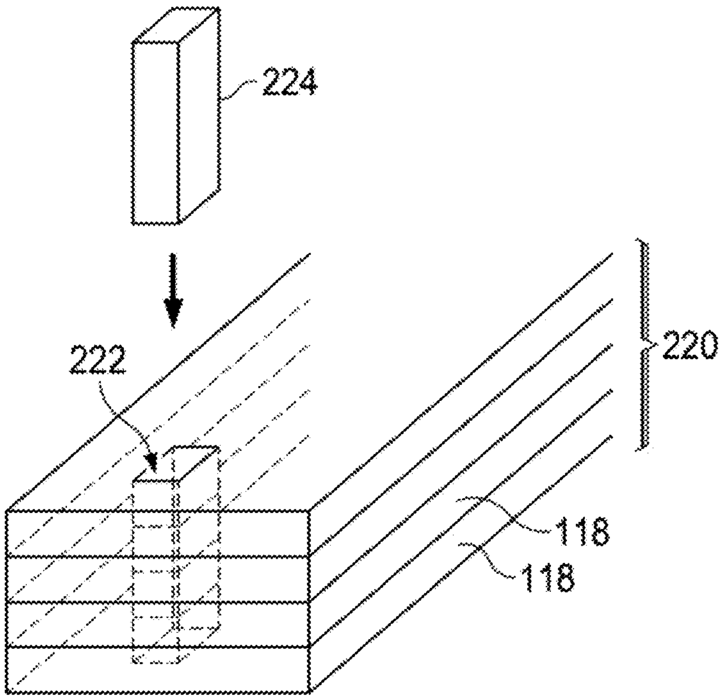
FIG. 2B is a perspective view of an alignment via in an example RF or electron beam structure, such as the RF or electron beam structure of FIG. 1A, and an alignment pin, in accordance with some embodiments of the present invention.

FIG. 2B is a perspective view of an example RF or electron beam structure 220, such as the RF or electron beam structure 100, having an example alignment via 222 formed across multiple layers 118 and an analogous alignment pin 224 configured to be inserted into the alignment via 222 to assist in aligning the multiple layers 118 before bonding and/or during bonding, in accordance with some embodiments of the present invention. By precisely locating each via segment of the alignment via 222 in each of the multiple layers 118, the analogous alignment pin 224 may be inserted into the alignment via 222 across the multiple layers 118 before and/or during bonding to ensure layer alignment post bonding. Although the alignment via 222 and alignment pin 224 are shown to have a rectangular cross section, the cross section may have a different shape, such as circular, oval, polygonal, polygonal modified with reliefs, etc. Further, the example waveguide 220 may include any number of alignment vias 222 across any sets of layers at any positions to assist in achieving layer alignment. In some embodiments, each of the via segments in each of the multiple layers can have the same or a different shape and/or dimension as other via segments. The analogous alignment pin 224 may have analogous shape(s) and/or dimension(s) with the via segments to precisely fit into the via once the multiple layers 118 are precisely positioned.

In some embodiments, the alignment pin 224 may be designed to have a length exactly equal to the via length to ensure that the end surfaces of the alignment pin 224 are flush with the terminal surfaces of the terminal layers 118 when inserted. In some embodiments, the alignment pin 224 may be slightly shorter so that the alignment pin 224 remains slightly recessed when inserted to avoid causing interference with external components and/or to assist with bonding with additional layers or external components disposed on one or both of the terminal surfaces of the terminal layers 118. In some embodiments, the alignment pin 224 may be longer that the via length to achieve desired alignment quality or other benefit. When inserted, one or both of its top surface and bottom surface may extend beyond a terminal surface of the terminal layers 118.

In some embodiments, the alignment pin 224 may be removable or permanently secured after bonding the multiple layers 118. In some embodiments, one or more rectangular alignment pins may assist to ensure straightness within tolerance of manufacture of individual length of the rectangular feature edge. A straight line can be cut within a few micron tolerance deviation. Utilizing one or more rectangular alignment pins ground to a few micron tolerance, the entire length of the feature edge can be maintained straight among all of the layers.

In some embodiments, the alignment pin 224 illustrates an example of an alignment pin that can be used to extend within two pin pockets of two components. As noted above with regard to FIGS. 1A, 1D and 2A and below with regard to FIG. 5, the cross-sectional shape of the pin can be circular, oval, polygonal, cross-shaped, rotated polygonal, etc. Further, different segments of the alignment pin can have different shapes based on the shape of the pin pockets into which the pin will be inserted.

Figure 3A:
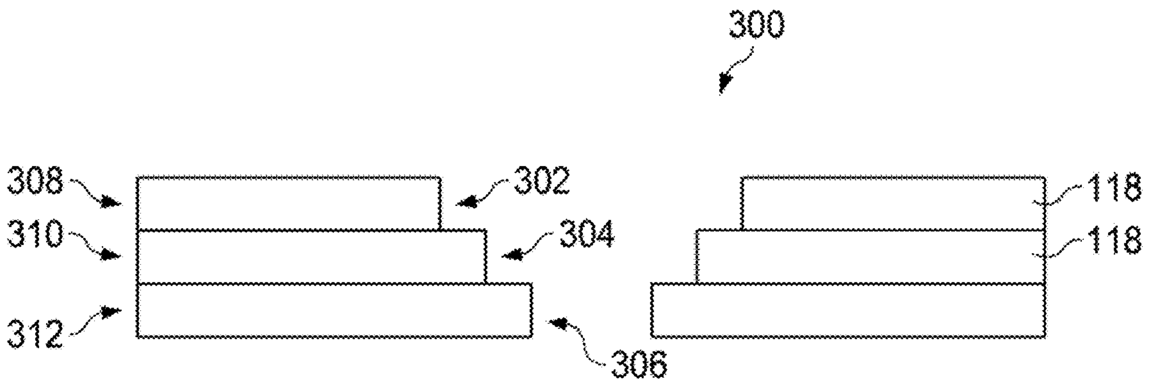
FIG. 3A is a cross-sectional side view across the diameter of the concentric-circular inspection feature of FIG. 2A, in accordance with some embodiments of the present invention.
Figure 3B:
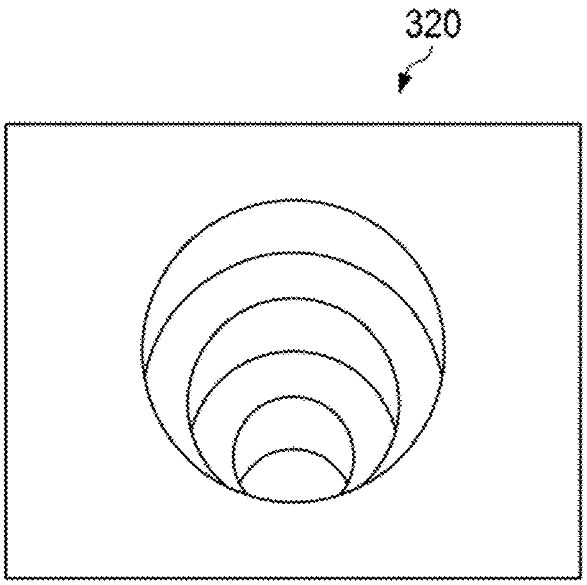
FIG. 3B is a perspective view of the concentric-circular inspection feature of FIG. 2A, in accordance with some embodiments of the present invention.

Referring back to FIG. 2A, the example RF or electron beam structure 100 further illustrates an example concentric-circular inspection feature 210. The concentric-circular inspection feature 210 may be formed across multiple layers 118 (as shown across three layers 118) by forming cutouts of gradually reducing or increasing size in each layer 118 to enable inspection of the positioning accuracy post bonding. If the layers 118 are positioned accurately, the concentric-circular inspection feature 210 should be concentric about the same axis. Further details of the concentric-circular are shown in FIGS. 3A and 3B. Although the concentric inspection feature includes circular cutouts, cutouts of other shapes, such as oval or polygonal, are also possible. Although the concentric-circular inspection feature 210 is being described as including cutouts, one skilled in the art is aware that the geometric features forming the concentric-circular inspection feature 210 need not be formed using a "cutting" process and can be formed in other ways.

FIG. 3A is a cross-sectional side view across the diameter of the concentric-circular inspection feature 210, in accordance with some embodiments of the present invention. The concentric-circular inspection feature 210 can be formed across two or more layers 118. As shown, the concentric-circular inspection feature 210 is formed across three layers 118 and includes gradually decreasing cylindrical cutouts 302, 304 and 306 respectively in the top layer 308, middle layer 310 and bottom layer 312. As indicated above, the concentric inspection feature may be formed with gradually decreasing cutouts of other shapes.

FIG. 3B is a perspective view of an example concentric-circular inspection feature 320 formed across multiple layers of an RF structure, in accordance with some embodiments of the present invention.

Figure 4A:
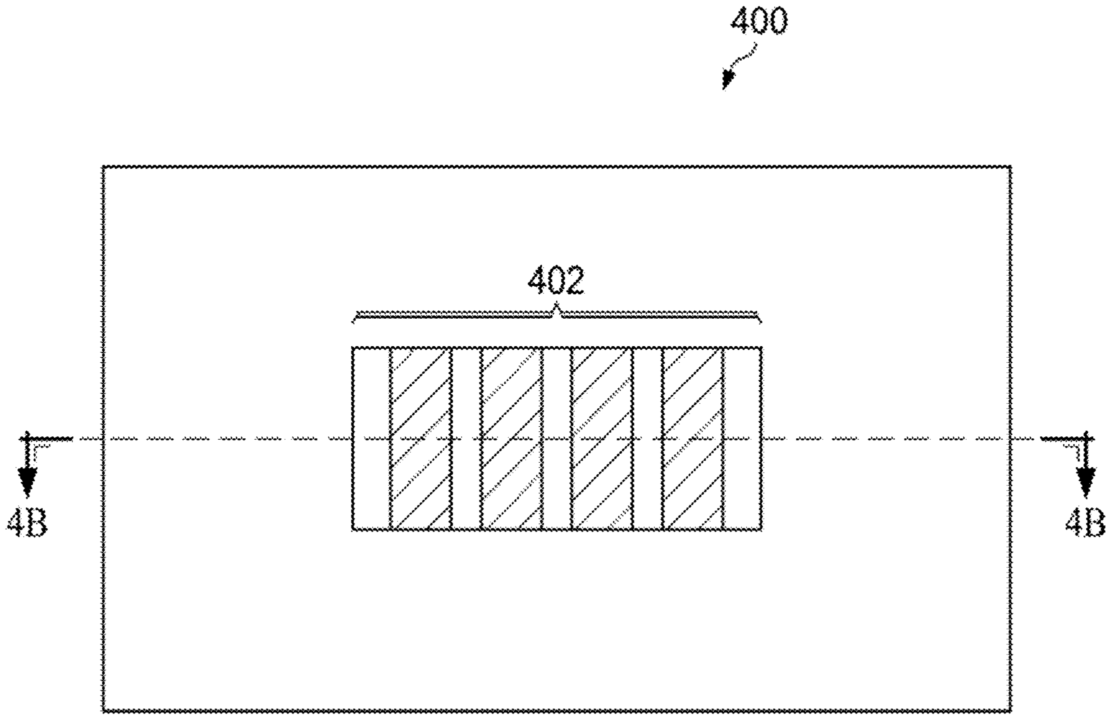
FIG. 4A is a top view of an RF or electron beam structure having a stair-pattern inspection feature, in accordance with some embodiments of the present invention.

FIG. 4A is a top view of an RF or electron beam structure 400 with a stair-pattern inspection feature 402, in accordance with some embodiments of the present invention. The stair-pattern inspection feature 402 includes cutouts in each layer 118 of a plurality of layers 118 (not shown). In adjacent layers 118, the cutouts may form "bridges" across a window perimeter. The bridges may be located in a predetermined relationship relative to each other, e.g., spaced apart by a prescribed distance horizontally and vertically as shown. The stair-pattern inspection features 402 may enable inspection of layer stacking order and layer alignment (e.g., to measure the amount of shift and skew of the layers after bonding) as well as to enable viewing into the assembled RF structure 400. Although the bridges are described as being formed using cutouts, one skilled in the art will recognize that they may be formed in other ways.

Figure 4B:
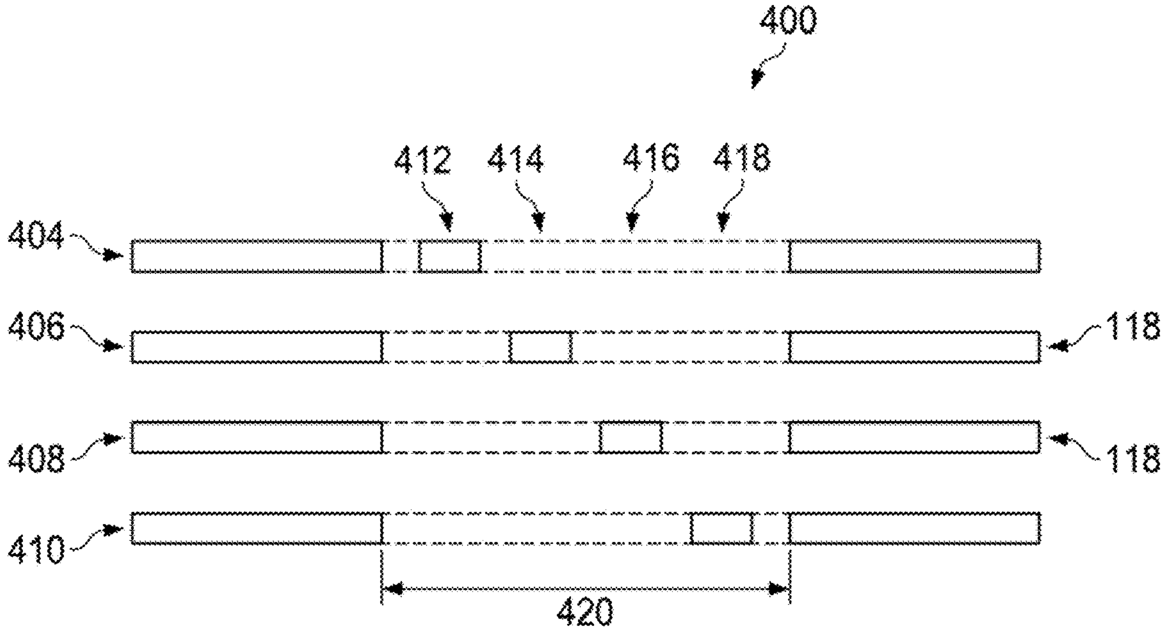
FIG. 4B is an exploded cross-sectional side view of the RF or electron beam structure having the stair-pattern inspection feature of FIG. 4A, in accordance with some embodiments of the present invention.

FIG. 4B is an exploded cross-sectional side view of the RF or electron beam structure 400 including of the stair-pattern inspection feature 402, in accordance with some embodiments of the present invention. The cross-sectional position is shown in FIG. 4A. The RF structure 400 includes a plurality of layers 118, comprising a first layer 404, a second layer 406, a third layer 408 and a fourth layer 410. Each layer 118 includes the same window perimeter 420, however including and/or retaining a bridge at a predetermined location across the window perimeter 420. The first layer 404 includes a first bridge 412 spaced a prescribed distance from the left side of the window perimeter 420. The second layer 406 includes a second bridge 414 spaced the prescribed distance from the right side of the first bridge 412. The third layer 408 includes a third bridge 416 spaced the prescribed distance from the right side of the second bridge 414. The fourth layer 410 includes a fourth bridge 418 spaced the prescribed distance from the right side of the third bridge 416 and spaced the prescribed distance from the right side of the window perimeter 420. Accordingly, after assembly and bonding, the stair-pattern window inspection feature 402 can be evaluated looking down from the first layer 404 or looking up from the fourth layer 410. Notably, the first layer 404 may not be the top-most layer and thus the stair-pattern window inspection feature 402 may not be visible from the top. Alternatively, the fourth layer 410 may not be the bottom-most layer and thus the stair-pattern window inspection feature 402 may not be visible from the bottom. Although the bridges 412, 414, 416 and 418 are shown as spaced apart by the same prescribed distance, the bridges 412, 414, 416 and 418 can be spaced apart by any distance. In some embodiments, the bridges 412, 414, 416 and 418 may be formed to be positioned directly above one another, forming a vertical wall and windows, vias and/or pockets on the left and right of the wall.

Figure 5:
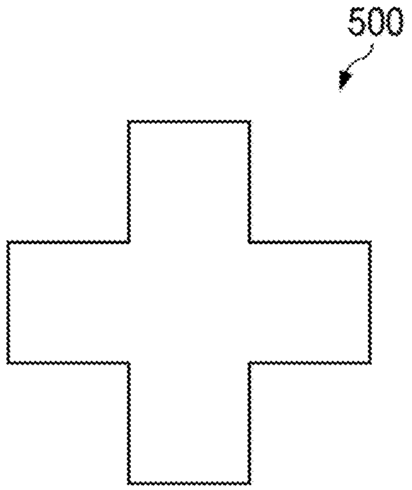
FIG. 5 is a top view of a cross-shaped alignment and/or inspection feature, in accordance with some embodiments of the present invention.

FIG. 5 is a top view of an example (e.g., cross-shaped) alignment and/or inspection feature 500, in accordance with some embodiments of the present invention. When the alignment and/or inspection feature 500 is formed in a plurality of layers 118, the via formed across the layers 118 can be inspected to confirm proper layer alignment (positional and/or rotational). In some embodiments, an inspection device can be used to ensure planarity of the walls extending through the layers 118. In some embodiments, the inspection device may include human vision, computer vision, optical devices, laser devices, or an analogous cross-shaped pin having an analogous cross-shaped cross-section.

Figure 6:
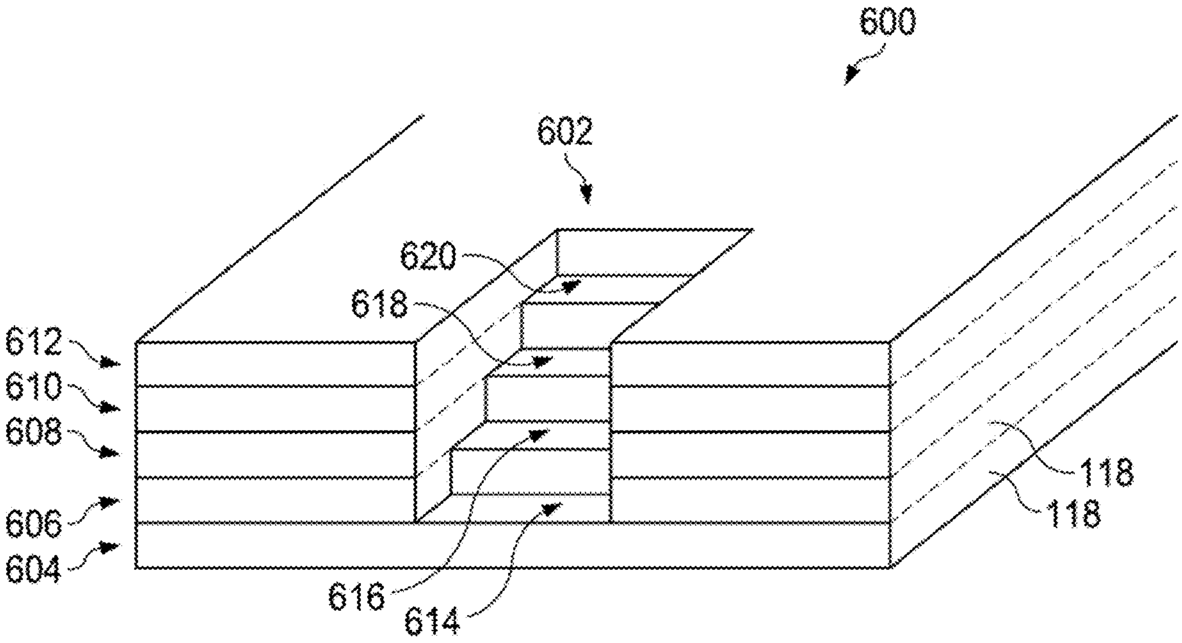
FIG. 6 is a perspective view of an RF or electron beam structure having a stair-step inspection feature, in accordance with some embodiments of the present invention.

FIG. 6 is a perspective view of a RF or electron beam structure 600 with a stair-step inspection feature 602 positioned on one edge of the RF structure 600, in accordance with some embodiments of the present invention. The RF or electron beam structure 600 may be formed from a stack of layers 118, including first layer 604, second layer 606, third layer 608, fourth layer 610 and fifth layer 612. Each of layers 606, 608, 610 and 612 may include an increasing cutout forming a stair of the stair step along the same edge of the RF or electron beam structure 600. That is, the first layer 604 may have no cutout on the one edge. The second layer 606 may include a cutout 614 of a prescribed distance from the one edge. The third layer 608 may include a cutout 616 of two prescribed distances from the one edge. The fourth layer 610 may include a cutout 618 of three prescribed distances from the one edge. And, the fifth layer 612 may include a cutout 620 of four prescribed distances from the one edge. Accordingly, if the layers 118 are properly positioned during assembly and bonding, the stair-step inspection feature 602 should present a stair step within certain tolerance limits. In some embodiments, the increase in each cutout may be the same increase, although it need not be. The cutouts may include the same or different increases.

Figure 7:
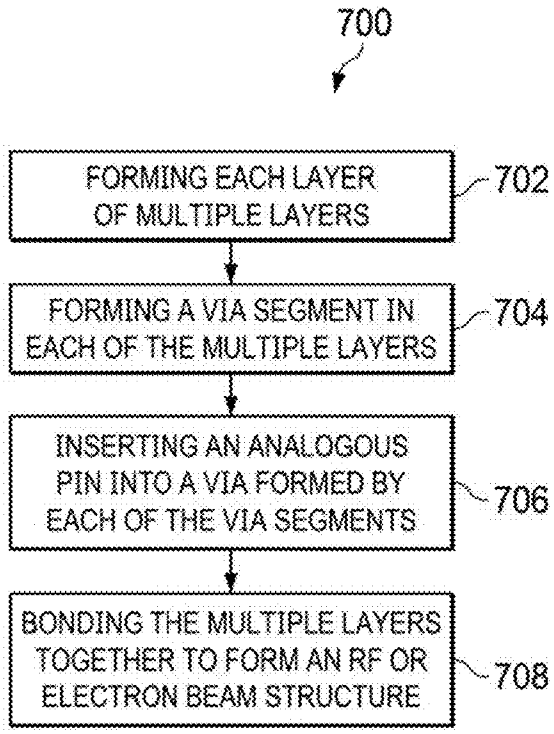
FIG. 7 is a flowchart illustrating a method of forming an RF or electron beam structure by forming multiple layers having formed therein an alignment via configured to receive an alignment pin that can assist in positionally and/or rotationally aligning the multiple layers before bonding and/or during bonding, in accordance with some embodiments of the present invention.

FIG. 7 is a flowchart illustrating a method 700 of forming an RF or electron beam structure by first forming multiple layers, e.g., multiple layers 118, having formed therein via segments that together form an alignment via, e.g., alignment via 222, configured to receive an alignment pin, e.g., alignment pin 224, that can assist in positionally and/or rotationally aligning the multiple layers 118 before bonding and/or during bonding, in accordance with some embodiments of the present invention.

The method 700 begins in step 702 with the step of forming each layer, e.g., layer 118 of multiple layers 118. In step 704, a via segment is formed in each layer 118 of the multiple layers 118. In some embodiments, the step 704 is integrated into the step 702. In some embodiments, the step 704 is a separate step from step 702. In step 706, the multiple layers 118 are assembled to align the via segments to form the alignment via, e.g., via 222, and the alignment pin, e.g., alignment pin 224, is inserted into the alignment via before bonding and/or during bonding in step 708. In step 708, the multiple layers 118 are bonded together to form the RF or electron beam structure, e.g., RF or electron beam structure 220, now that the alignment pin has positionally and/or rotationally aligned the layers 118.

In some embodiments, the present invention provides a method of manufacturing a radio frequency (RF) or electron beam structure, comprising forming each layer of multiple layers to be assembled and bonded together with positional alignment, the forming each layer including forming a first via segment of a first particular shape and dimension in the layer at a first location in the layer, such that when the first via segments of the multiple layers are assembled with positional alignment the multiple first via segments align to form a first via; and inserting a first analogous pin into the first via, the first analogous pin being formed based on the first particular shape and dimension of each of the first via segments, such that inserting the first analogous pin into the first via assists in causing the multiple layers to be assembled with positional alignment.

The structure may include a waveguide or an interaction structure. The first particular shape may include a circular cross-section. The first particular shape may include a polygonal cross-section, such that inserting the first analogous pin into the first via further assists in causing the multiple layers to be assembled with rotational alignment. Each of the via segments may include an identical shape and dimension, and the via may include a consistent cross-section across its length. The first analogous pin may include a top surface, a bottom surface and a length, and the length of the first analogous pin may be identical to a length of the first via, such that when the first analogous pin is inserted into the first via each of the top surface and bottom surface is flush with a surface of a layer of the multiple layers. The first analogous pin may include a top surface, a bottom surface and a length, and the length of the first analogous pin may be shorter than a length of the first via, such that when the first analogous pin is inserted into the first via each of the top surface and bottom surface is recessed from a surface of a layer of the multiple layers. The method may further comprise bonding the multiple layers together and removing the first analogous pin after the bonding of the multiple layers. The method may further comprise, after removing the first analogous pin, evaluating one or more walls of the first via to inspect positional alignment. The forming each layer of multiple layers to be assembled and bonded together with positional alignment may include forming a second via segment of a second particular shape and dimension in the layer at a second location in the layer, such that when the second via segments of the multiple layers are assembled with positional alignment the multiple layers align to form a second via; and the method may further comprise inserting a second analogous pin into the second via, the second analogous pin being formed based on the second particular shape and dimension of each of the second via segments, such that inserting the first analogous pin into the first via and inserting the second analogous pin into the second via assist in causing the multiple layers to be assembled with positional and rotational alignment.

Additional steps and details are described above with regard to FIGS. 1A, 1B, 1C, 1D, 2A, 2B, 3A, 3B, 4A, 4B, 5 and 6.

Figure 8:
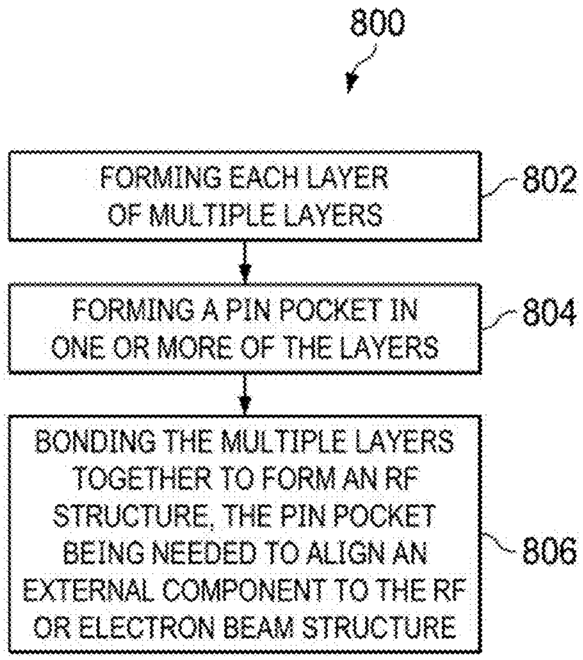
FIG. 8 is a flowchart illustrating a method of forming an RF or electron beam structure using multiple layers having formed therein a pin pocket for receiving an alignment pin for assisting with alignment to an external component, in accordance with some embodiments of the present invention.

FIG. 8 is a flowchart illustrating a method 800 of forming an RF or electron beam structure, e.g., RF or electron beam structure 100, using multiple layers, e.g., multiple layers 118, having formed therein a pin pocket, e.g., pin pocket 106, 202, 204, 206, 208 or 212, for receiving an alignment pin for assisting with alignment to an external component, in accordance with some embodiments of the present invention. The pin pocket may be formed in a single layer 118 or multiple layers 118.

The method 800 begins in step 802 with the step of forming each layer, e.g., layer 118 of multiple layers 118. In step 804, a pin pocket 106, 202, 204, 206, 208 or 212 is formed in one or more of the layers 118. In some embodiments, the step 804 is integrated into the step 802. In some embodiments, the step 804 is a separate step from step 802. In step 806, the multiple layers 118 are bonded together to form the RF structure, e.g., RF structure 100, such that a pin pocket 106, 202, 204, 206, 208 or 212 and a pin pocket of an adjacent external component can receive an alignment pin therein and therebetween to align the RF structure 100 (or a feature of the RF structure) with the external component (or a feature of the external components). In some embodiments, the alignment pin may be partially or fully inserted before, during and/or after bonding in step 806. The length of the alignment pin may be longer than the depth of the pin pocket 106, 202, 204, 206, 208 or 212 but less than or equal to the sum of the depths of the pin pocket 106, 202, 204, 206, 208 or 212 and the pin pocket of the external components.

Additional steps and details are described above with regard to FIGS. 1A, 1B, 1C, 1D, 2A, 2B, 3A, 3B, 4A, 4B, 5 and 6.

Figure 9:
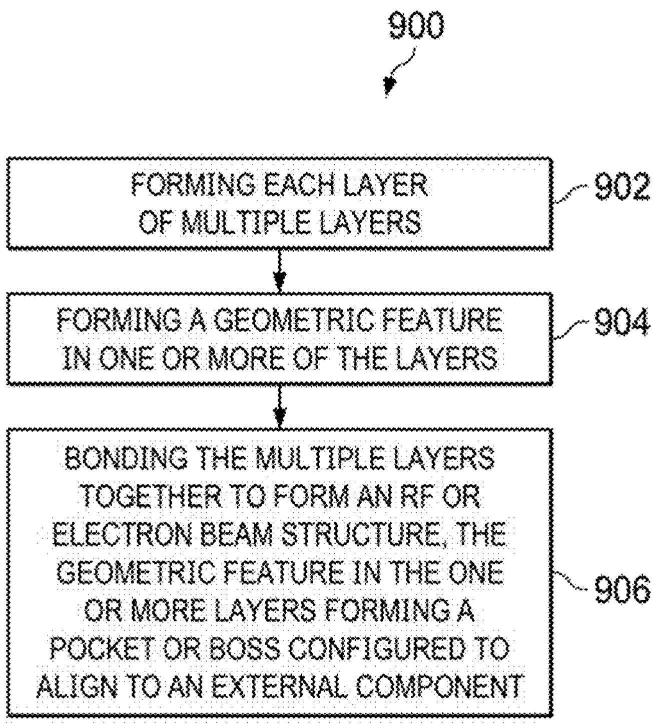
FIG. 9 is a flowchart illustrating a method of forming an RF or electron beam structure using multiple layers such that one or more layers have one or more geometric features to form a pocket or boss for assisting with alignment to an external component, in accordance with some embodiments of the present invention.

FIG. 9 is a flowchart illustrating a method 900 of forming an RF or electron beam structure, e.g., RF or electron beam structure 100, using multiple layers 118 such that one or more layers have one or more geometric features to form a pocket, e.g., pocket 102, or boss, e.g., boss 104, for assisting with alignment to an external component, in accordance with some embodiments of the present invention.

The method 900 begins in step 902 with the step of forming each layer, e.g., layer 118 of multiple layers 118. In step 904, a geometric feature is formed in one or more of the layers 118. In some embodiments, the step 904 is integrated into the step 902. In some embodiments, the step 904 is a separate step from step 902. In step 906, the multiple layers 118 are bonded together to form the RF or electron beam structure 100, the geometric features in the one or more layers forming the pocket 102 or boss 104 configured to positionally and/or rotationally align the RF or electron beam structure 100 (or a feature of the RF or electron beam structure 100) with an external component (or a feature of the external components).

Additional steps and details are described above with regard to FIGS. 1A, 1B, 1C, 1D, 2A, 2B, 3A, 3B, 4A, 4B, 5 and 6.

Figure 10:
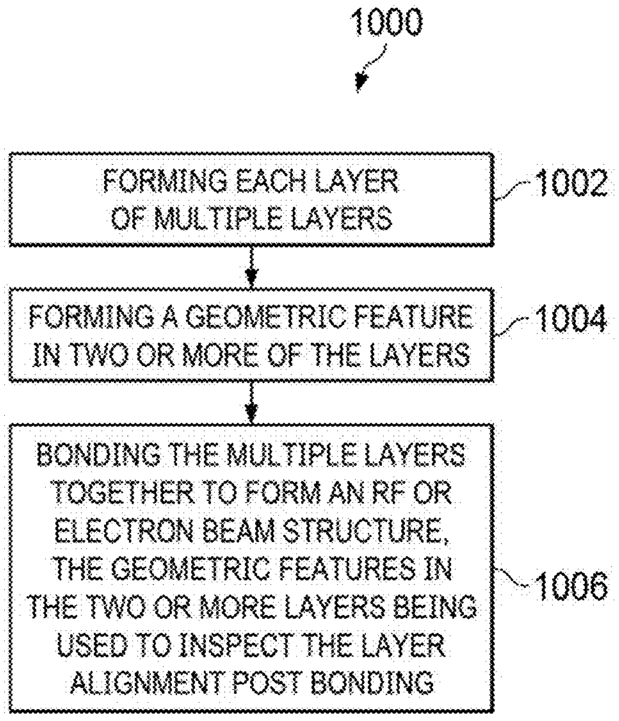
FIG. 10 is a flowchart illustrating a method of forming an RF or electron beam structure using multiple layers having geometric features formed in two or more of the layers and configured to assist cooperatively with post-bonding inspection of positional and/or rotational alignment, in accordance with some embodiments of the present invention.

FIG. 10 is a flowchart illustrating a method 1000 of forming an RF or electron beam structure, e.g., RF or electron beam structure 200, 300, 400 and/or 600, using multiple layers, e.g., multiple layers 118, having geometric features formed in two or more of the layers 118 and configured to assist cooperatively with post-bonding inspection of positional and/or rotational alignment, in accordance with some embodiments of the present invention.

The method 1000 begins in step 1002 with the step of forming each layer, e.g., layer 118 of multiple layers 118. In step 1004, geometric features are formed in two or more of the multiple layers 118. In some embodiments, the step 1004 is integrated into the step 1002. In some embodiments, the step 1004 is a separate step from step 1002. In step 1006, the multiple layers 118 are bonded together to form the RF or electron beam structure, e.g., RF or electron beam structure 200, 300, 400 and/or 600, the geometric features in the two or more layers 118 cooperatively forming an inspection feature for inspecting positional and/or rotational layer or feature alignment post bonding. Example geometric features include the geometric features that form the concentric-circular inspection feature 210, the geometric features that form stair-pattern inspection feature 402, the geometric features that form cross-shaped alignment and/or inspection feature 500, and/or the geometric features that form the stair-step inspection feature 602.

Additional steps and details are described above with regard to FIGS. 1A, 1B, 1C, 1D, 2A, 2B, 3A, 3B, 4A, 4B, 5 and 6.

The foregoing description of the preferred embodiments of the present invention is by way of example only, and other variations and modifications of the above-described embodiments and methods are possible in light of the foregoing teaching. The embodiments described herein are not intended to be exhaustive or limiting. The present invention is limited only by the following claims.

The invention claimed is:

1. An RF or electron beam structure, comprising:

multiple layers to be assembled and bonded together with positional and rotational alignment to form the RF or electron beam structure, each respective layer of the multiple layers including a first via segment of a first particular shape and dimension in the respective layer at a first location in the respective layer, such that when the multiple layers are assembled with at least the positional alignment the first via segments of the multiple layers align to form a first via, the first via including a predetermined pattern to assist in inspecting the at least positional alignment across at least some of the multiple layers, wherein each of at least some of the first via segments of the at least some of the multiple layers includes an identical shape and a different dimension, and the first via includes a decreasing step pattern across the at least some of the multiple layers as it descends from an outermost layer; and a first analogous pin configured to be inserted into the first via, the first analogous pin configured to have the first particular shape and dimension based on each of the first via segments, such that when the first analogous pin is inserted into the first via the first analogous pin assists in causing the multiple layers to be assembled with the at least positional alignment.

2. The structure of claim 1, wherein the structure includes a waveguide.

3. The structure of claim 1, wherein the structure includes an electron beam opening.

4. The structure of claim 1, wherein the structure includes an interaction structure.

5. The structure of claim 1, wherein the first particular shape of the first via segment in each respective layer includes a polygonal cross-section.

6. The structure of claim 1, wherein the first analogous pin includes a top surface, a bottom surface and a length, the length of the first analogous pin is identical to a length of the first via, and the first analogous pin is configured such that when inserted into the first via each of the top surface and bottom surface is flush with a surface of a layer of the multiple layers.

7. The structure of claim 1, wherein the first analogous pin includes a top surface, a bottom surface and a length, the length of the first analogous pin is shorter than a length of the first via, and the first analogous pin is configured such that when inserted into the first via each of the top surface and bottom surface is recessed from a surface of a layer of the multiple layers.

8. The structure of claim 1, wherein the first analogous pin includes a top surface, a bottom surface and a length, and the length of the first analogous pin is longer than a length of the first via, and the first analogous pin is configured such that when inserted into the first via at least one of the top surface or bottom surface extends beyond a surface of a layer of the multiple layers.

9. The structure of claim 1, wherein the first analogous pin is configured for removal after the bonding of the multiple layers.

10. The structure of claim 1, wherein each respective layer of the multiple layers to be assembled and bonded together with positional and rotational alignment includes a second via segment of a second particular shape and dimension in the respective layer at a second location in the respective layer, such that when the multiple layers are assembled with positional and rotational alignment the second via segments of the multiple layers align to form a second via; and a second analogous pin configured to be inserted into the second via, the second analogous pin being formed based on the second particular shape and dimension of each of the second via segments, such that the first analogous pin when inserted into the first via and the second analogous pin when inserted into the second via assist in causing the multiple layers to be assembled with additional positional and rotational alignment.

11. The structure of claim 1, wherein the pattern include a pattern of concentric circles of decreasing size as the circles descend from the outermost layer.

12. The structure of claim 1, wherein the first analogous pin further assists in causing the multiple layers to be assembled with rotational alignment.

* * * * *